United States Patent [19]
Ishiyama

[11] Patent Number: 6,013,917
[45] Date of Patent: Jan. 11, 2000

[54] UV RAY IRRADIATION APPARATUS HAVING SCRAPER RINGS FITTED TO LIGHT TRANSMISSION TUBES

[75] Inventor: Eiichi Ishiyama, Hachioji, Japan

[73] Assignee: Photoscience Japan Corporation, Japan

[21] Appl. No.: 09/038,343

[22] Filed: Mar. 11, 1998

Related U.S. Application Data

[63] Continuation-in-part of application No. 08/818,965, Mar. 14, 1997, Pat. No. 5,874,740.

[30] Foreign Application Priority Data

Mar. 12, 1997 [JP] Japan ................................. 9-074622

[51] Int. Cl.[7] .................................................. C02F 1/32
[52] U.S. Cl. .................................. 250/431; 250/436
[58] Field of Search .............................. 250/431, 432, 250/436

[56] References Cited

U.S. PATENT DOCUMENTS

| | | | |
|---|---|---|---|
| 1,849,201 | 3/1932 | Niemann | 15/104.04 |
| 3,182,193 | 5/1965 | Ellner et al. | 250/43.5 |
| 3,462,597 | 8/1969 | Young | 250/431 |
| 3,562,520 | 2/1971 | Hippen | 250/43 |
| 4,367,410 | 1/1983 | Wood | 250/431 |
| 4,968,489 | 11/1990 | Peterson | 250/436 |
| 5,133,945 | 7/1992 | Hallett | 422/186.3 |
| 5,227,140 | 7/1993 | Hager et al. | 422/186.3 |
| 5,401,474 | 3/1995 | Hager et al. | 422/186.3 |
| 5,418,370 | 5/1995 | Maarschalkerweerd | 250/431 |
| 5,439,595 | 8/1995 | Downey, Jr. | 210/748 |
| 5,501,843 | 3/1996 | Peterson | 422/186.3 |
| 5,874,740 | 2/1999 | Ishiyama | 250/431 |

FOREIGN PATENT DOCUMENTS 2-48092  2/1990  Japan .

*Primary Examiner*—Jack I. Berman
*Attorney, Agent, or Firm*—Graham & James LLP

[57] ABSTRACT

A UV irradiation apparatus for treating fluids employs light transmission tubes having UV lamps therein and a smooth fluorocarbon resin layer over the outside surface of the tubes. For example, a Teflon® sheath or film over the outside surface of the tubes may be employed. A tightly fitted scraper ring with an attached cleaning fluid chamber reciprocates over the coated tubes to clean contaminants from the surface thereof, which contaminants would otherwise impair the UV irradiation ability of the lamps within the tubes.

14 Claims, 2 Drawing Sheets

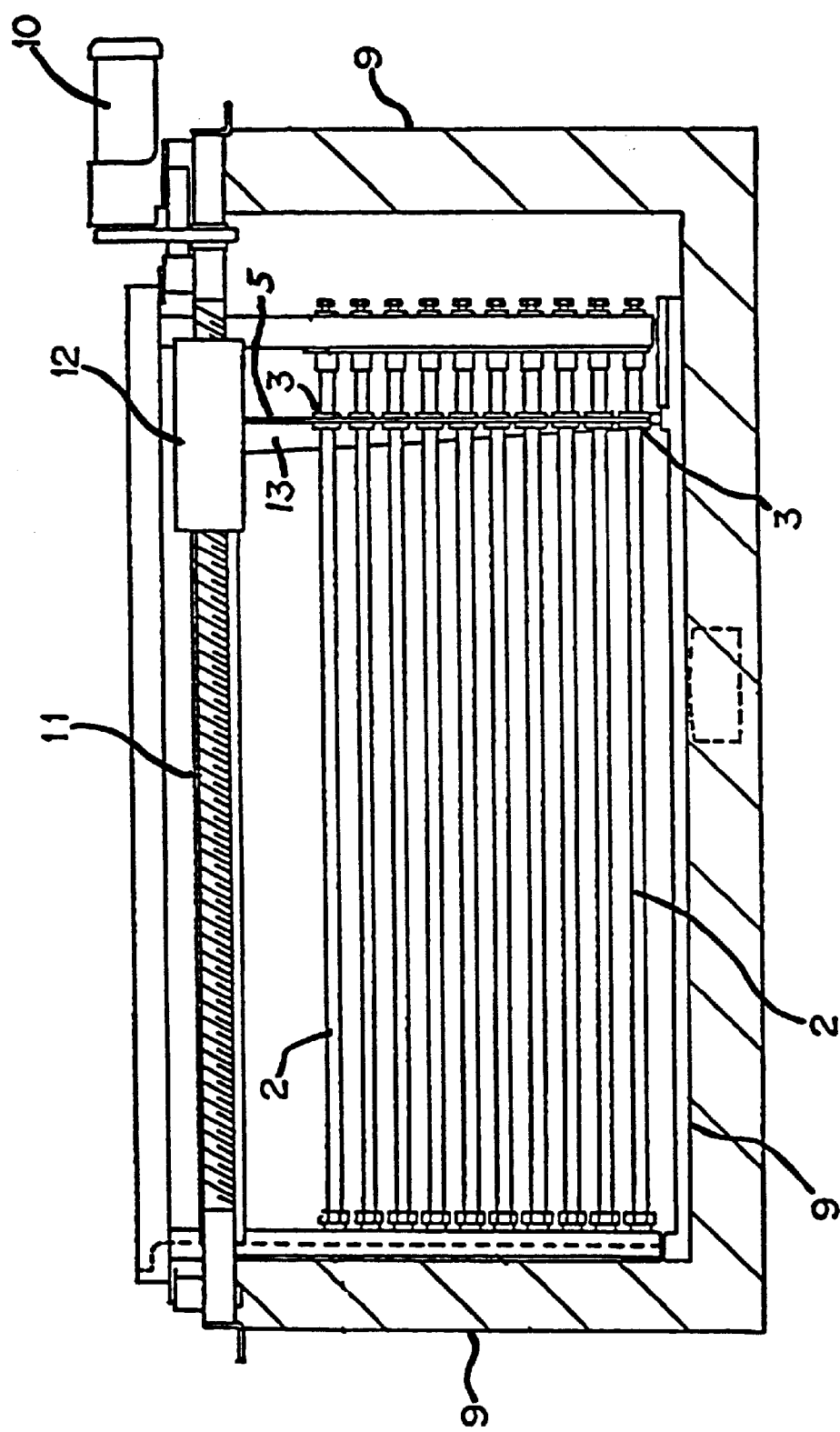

UV RAY IRRADIATION APPARATUS HAVING SCRAPER RINGS FITTED TO LIGHT TRANSMISSION TUBES

RELATED APPLICATION INFORMATION

The present application is a continuation-in-part of application Ser. No. 08/818,965 filed Mar. 14, 1997 now U.S. Pat. No. 5,874,740.

BACKGROUND OF THE INVENTION

1. Field of the Invention

The present invention is concerned with UV ray irradiation equipment used for UV ray irradiation of untreated water for sterilization, oxidative decomposition of organics, decomposition of harmful substances, etc.

2. Description of the Prior Art And Related Information

When the conventional UV irradiation equipment has been used for an extended period of time for the purpose of removing impurities from untreated water such as sewage, iron, hardness components such as calcium and so forth precipitate on the surface of the UV ray transmission tubes which have internal UV ray irradiation lamps therein which surface comes in contact with the untreated water. These precipitates (or scale) obstruct the transmission of UV rays through the UV ray transmission tubes and deteriorate the irradiation efficiency and therefore degrade the purity of the treated water. To cope with the above-mentioned deterioration of UV ray transmission efficiency due to fouling on the surface of the UV ray transmission tubes, scrapers made of rubber, Teflon® and the like have been used to physically clean the surface of the UV ray transmission tubes. However, this physical method of scraping the surface of the UV ray transmission tubes leaves much to be desired as hardness components and other scales deposited on the surface of the UV ray transmission tubes usually consist of very fine particles which tend to penetrate into and clog concave pits on the surface, thereby making it difficult to wash out such scale by scrapers.

Alternatively, the UV ray transmission tubes are immersed in a tank filled with a cleaning solution such as a solution of weak acids, e.g. phosphoric acid, a solution of scale dispersant or the like, thereby removing scale such as hardness components from the surface of the UV ray transmission tubes.

The foregoing chemical cleaning of the surface of the UV ray transmission tubes has the following drawbacks:

(1) It is cumbersome and time-consuming to disassemble a UV ray transmission tube on the surface of which scale such as hardness components has deposited and to immerse the tube in a cleaning tank.

(2) In order to carry out the above-mentioned cleaning work, ongoing UV irradiation has to be suspended, which in turn results in deterioration of the UV irradiation efficiency.

(3) An excessive quantity of cleaning solution has to be used in the cleaning tank, which entails an expensive cleaning cost.

(4) The cleaning work is not amenable to automation and cannot therefore go with the trend of equipment automation.

Accordingly, a need presently exists for a means of more efficiently and economically cleaning scale from the surfaces of UV ray transmission tubes used in UV ray treatment systems.

SUMMARY OF THE INVENTION

It is a principal object of the present invention to provide novel means for thoroughly washing from the surface of a UV ray transmission tube those fine particles deposited in concave pits on the tube surface which cannot be removed physically by conventional scrapers made of rubber, Teflon® and the like, thereby to keep up the UV transmission efficiency of the UV irradiation tube.

Furthermore, the present invention permits achieving the following objectives which cannot be carried out with chemical cleaning using such conventional cleaning solutions as solutions of weak acids such as, for example, phosphoric acid, and scale dispersants:

(1) To easily clean off in situ scale comprised of hardness components, etc. from a UV ray transmission tube without disassembling the UV ray irradiation unit and taking out the tube(s) fouled with scale;

(2) To keep up the UV irradiation efficiency without interrupting the UV irradiation process for cleaning work to remove scale comprised of hardness components, etc. and deposited on the UV transmission tube;

(3) To minimize the cleaning cost by reducing the consumption of cleaning solution by feeding a small quantity of a cleaning solution to the surface of the UV ray transmission tube and cleaning off scale comprised of hardness components, etc. and deposited on the surface of the UV ray transmission tube by means of a scraper ring; and (4) To facilitate automation of the cleaning work thereby going with the trend of equipment automation.

Still further, the present invention has an additional objective of enhancing the UV transmission efficiency of light transmission tube(s) having internal light irradiation lamp(s), by providing said light transmission tube(s) with a layer of a fluorocarbon resin or film to eliminate concave pits on the surface of said light transmission tube(s) and improving on its smoothness, thereby preventing fine particles of scale consisting of hardness components and the like from adhering to the surface of said light transmission tube(s) during the light irradiation treatment of untreated water and also by automatically and effectively cleaning, during the light irradiation treatment of untreated water, the smoothened surface of said light transmission tube(s) by dislodging any scale deposited on said smoothened surface by means of a scraper ring with a minimum of friction resistance.

In accordance with the above objectives, the present invention provides a UV irradiation apparatus in which a UV ray transmission tube(s) having internal UV ray lamps is provided with a smooth layer of a resin material on the outside surface thereof and is externally fitted with a scraper ring(s), wherein UV ray irradiation of untreated water for sterilization, oxidative decomposition of organics, decomposition of harmful substances, etc. may be performed while cleaning said UV ray transmission tube(s) by reciprocally sliding over the outer circumference surface of the tube(s) said scraper ring(s). The scraper ring has a built-in cleaning solution chamber in contact with the smooth layer on the outer circumference surface of said tube(s) and which is slidably and tightly fitted to said tube(s), and communicating with a cleaning solution supply line with said cleaning solution chamber.

The present invention further provides a UV irradiation apparatus in which a UV ray transmission tube having an internal UV ray lamp(s) is externally fitted with a scraper ring(s), wherein a sealing material such as O-rings is provided at a position on the surface of said UV ray transmission tube with which said scraper ring comes in contact adjacent to said cleaning solution chamber(s) of said scraper ring(s).

The present invention further provides a UV irradiation apparatus in which a UV ray transmission tube(s) having internal UV ray lamp(s) is externally fitted with a scraper ring(s), wherein said scraper ring(s) is reciprocally and repeatedly moved over the circumference surface of the UV ray transmission tube(s). For example, said scraper ring(s) may be fitted to a movable frame which is fitted to a rotating screw which is externally fitted to said UV ray transmission tube and rotated normally and reversely by means of a drive unit such as a motor The present invention further provides a UV irradiation apparatus in which a UV ray transmission tube(s) having an internal UV ray lamp(s) is externally fitted with a scraper ring(s), wherein the surface of said light transmission tube(s) is coated with a fluorocarbon resin or film, thereby enhancing the smoothness and slidability of the surface of said UV ray transmission tube(s).

The present invention further provides a UV irradiation apparatus in which a UV ray transmission tube(s) having an internal UV ray lamp(s) is externally fitted with a scraper ring(s), wherein said scraper ring(s) is made of Teflon® composed of copolymer resin of tetrafluoroethylene-perfluoroalkylvinyl ester, thereby minimizing the friction between the surface of said UV ray transmission tube(s) and said scraper ring(s).

BRIEF DESCRIPTION OF THE DRAWINGS

FIG. 2 is a explanatory drawing of the UV ray irradiation apparatus in which a plurality of scraper rings each slidably fitted to the circumferential surface of each light transmission tube are connected to a moving frame.

Figure 1:
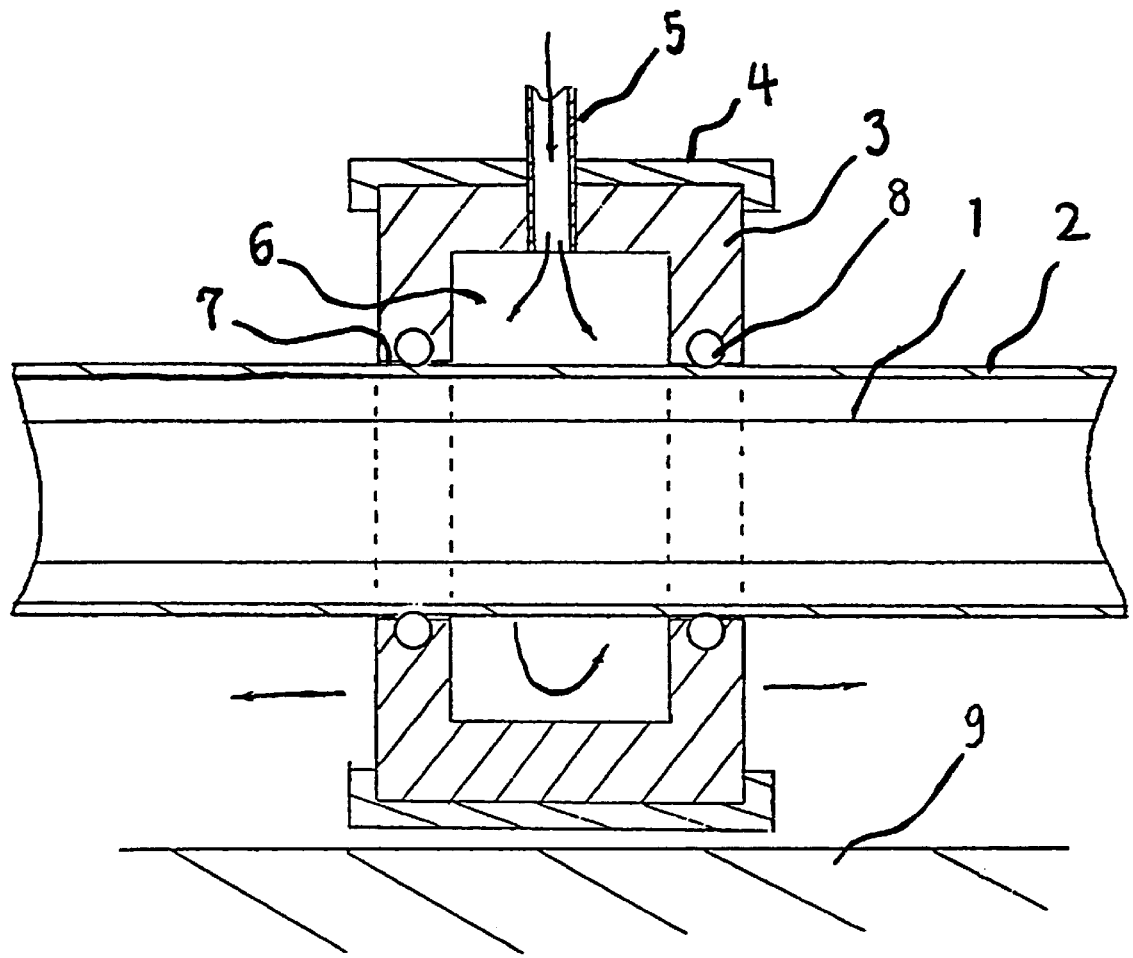
FIG. 1 is a sectional view of a UV ray irradiation apparatus in which a scraper ring having a internal cleaning solution chamber is slidably fitted on the circumferential surface of a light transmission tube.

Reference Numerals of Elements in the Drawings:

1. UV ray lamp
2. Light transmission tube
3. Scraper ring
4. Cover
5. Cleaning solution feed pipe
6. Cleaning solution chamber
7. Scraper ring end
8. Sealing material
9. UV ray irradiation equipment
10. Drive unit
11. Rotating screw stem
12. Moving frame
13. Support

DETAILED DESCRIPTION OF THE INVENTION

An exemplary embodiment of the UV irradiation apparatus according to the present invention and as applied to sterilization of a liquid containing bacteria will be explained. As illustrated in FIG. 1, a flow route is formed for the sterilization of a liquid in a UV irradiation unit by horizontally (or vertically) arranging therein a light transmission tube 2 made of quartz glass and internally fitted with a light irradiation lamp such as for example a UV irradiation lamp 1.

A scraper ring 3 with a cover 4 is slidably fitted to light transmission tube 2 internally having a UV irradiation lamp 1. More specifically, said scraper ring 3 is capable of being slid horizontally along the circumference of said light transmission tube 2. This scraper ring 3 has an internal cleaning solution chamber 6 which contains a cleaning solution such as a phosphoric acid solution and which communicates with a cleaning solution feed piping 5. As indicated earlier, said light transmission tube 2 made of quartz glass and internally fitted with a light irradiation lamp may also be aligned vertically with said scraper ring 3 being slid up and down (reciprocally) along the circumference of said light transmission tube 2.

Additionally stated, any friction between the quartz UV ray transmission tube 2 internally fitted with a UV ray lamp(s) 1 and the scraper ring 3 may be reduced by coating the surface of the quartz UV ray transmission tube 2 with fluorocarbon resin to eliminate concave pits or, distortions on said surface, thereby enhancing the smoothness and slidability of said surface. FEP (tetrafluoroethylene-hexafluoropyrene copolymer) is the fluorocarbon resin of choice. Any other fluorocarbon resin may be used for the coating of the surface of the UV ray transmission tube 2 as long as the fluorocarbon resin is permeable to UV rays and the like, not liable to deterioration due to UV rays and the like and has adequate physical stability. The thickness of the coating in a range of 0.3 to 0.5 mm will suffice.

The fluorocarbon resin may be coated on the surface of UV ray transmission tube 2 by known methods, for example, by covering this tube with a tubular, heat contraction fluorocarbon resin and then by heating this resin to contract it. Alternatively, this film of the fluorocarbon resin may by affixed to the surface of the UV ray transmission tube 2.

Any concave pits and/or distortions on the UV ray transmission tube 2 may also be eliminated by polishing the surface of the UV ray transmission tube 2. When it is made of a elastic material such for example as rubber as mentioned earlier, said scraper ring tightly comes in contact with the outer circumference surface of said light transmission tube 2, especially because the tip 7 of said scraper ring is elastic, thereby preventing the solution such as a phosphoric acid solution stored in said cleaning chamber 6 from leaking from any interstice between said scraper ring 3 and said cleaning solution chamber 6.

When the scraper ring 3 is made of a nonelastic material such as Teflon® and stainless steel, any leakage of cleaning solution from the interstice between said scraper ring 3 and said cleaning chamber 6 can be prevented by fitting sealing materials 8 such as O-rings at the ends 7 of said scraper ring 3 or at positions where said scraper ring 3 comes in contact with said light transmission tube 2 and adjacent to said cleaning solution chamber 6.

Even when said scraper ring 3 is made of a elastic material such as rubber, sealing materials 8 such as O-rings may be fitted at the ends 7 of said scraper ring 3 and adjacent to said cleaning solution chamber 6 thereby securely preventing any leakage of cleaning solution from the interstice between said scraper ring 3 and said cleaning chamber 6.

The scraper ring 3 may be made of natural or synthetic rubber. Most preferable is a scraper 3 made of Teflon®, especially Teflon® comprised of tetrafluoroethylene-perfluoroalkylvinyl ester copolymer resin which contributes much to reducing the friction between the scraper 3 and the UV ray transmission tube 2.

Said scraper ring 3 is reciprocally slid over the circumference of said light transmission tube 2, thereby bringing about a synergetic effect of said scraper ring 3 and the cleaning solution stored in said cleaning solution chamber to dislodge and clean off not only scale comprising of hardness components deposited on the circumference surface of said light transmission tube 2 but also scale comprising of fine particulate hardness components which has penetrated into concave pits on the surface of said light transmission tube 2. Said scraper ring 3 may be reciprocally slid either manually or automatically by any known sliding means such as a hydraulic cylinder.

For instance, as illustrated in FIG. 2 it offers convenience automatically to move reciprocally (back and forth) said scraper rings 3 along the circumferences of said light transmission tubes 2 by connecting said scraper rings 3 to a sliding frame 12 which is in turn slidably fitted to a rotating screw stem 11 rotated normally and reversely by means of a drive unit 10.

When a plurality of light transmission tubes 2 internally fitted with UV irradiation lamps are installed in a UV ray irradiation unit, said scraper ring 3 is slidably fitted to each light transmission tube or fitted to each light transmission tube so that said scraper rings 3 as one member are slid reciprocally (back and forth) over the circumference of light transmission tubes 2, while a plurality of said slide rings 3 are fitted to a support 13 of said sliding frame 12 which is slidably fitted to the aforementioned revolving screw stem 11.

Examples of UV lamps which can be used include low pressure sterilization lamps with a dominant wave length of 254 nm, low pressure ozone lamps with dominant wave length's of 185 and 254 nm, and medium-and high-pressure lamps with dominant wave length lengths of 185, 254 and 365 nm. In addition, sunlight lamps, chemical lamps, black light lamps, metal halide lamps, sodium lamps and other lamps with wave lengths of 700 nm or longer can also be used depending upon the application or the purpose of light irradiation treatment.

Quartz glass which is less expensive is often used as the material of construction of light transmission tubes 2. As mentioned earlier, Teflon® can also be used as this material of construction. In addition, any materials that have higher transmissivities and do not release any leachables such as fluorocarbon resins may be used as this material of construction.

As the material of construction of scraper rings 3, elastic materials such as rubber and Teflon®, and stainless steel may be used as mentioned earlier. In addition, plastics or ceramics may be employed which are resistant to chemicals may be used. For example, polypropylene and polyethylene may be used. As mentioned earlier, the scraper ring 3 has an internal cleaning chamber 3 which communicates with a cleaning solution feed line 5. The scraper ring 3 is fitted to the light transmission tube 2 having internal UV lamp 1 so that the scraper ring 3 can be slid reciprocally (back and forth) along the circumference of the tube 2.

A phosphoric acid solution which is less expensive comes in handy as the cleaning solution to be fed automatically to the cleaning solution chamber 6 of the scraper ring 3. Besides a phosphoric acid solution, a solution of any weak acid such as citric acid may be used. In addition, a solution of any chemical which can wash out and remove scale comprised of hardness components, etc. may be used as the cleaning solution. An optimum concentration of these cleaning solutions ranges from 5 to 10% in the case, for example, of a phosphoric acid solution. The cleaning solution should preferably fill, under pressure, the cleaning solution chamber 6 of the scraper ring 3, and come in contact with the entire circumference surface of the light transmission tube 2.

The frequency of the cleaning of the light transmission tube 3 should be determined depending upon the quantity of scale comprised of hardness components, etc. which has deposited on the circumference surface of the light transmission tube 2, especially the quantity of scale of fine particles comprised of hardness components, etc. which has penetrated into concave pits on the circumference surface of the light transmission tube 2, the kind and concentration of the cleaning solution and so forth. Usually, it suffices to slide the scraper ring 3 to clean the circumference of the light transmission tube 2 twice to thrice a day.

The manner of operation of the UV ray irradiation 9 equipment with the scraper ring(s) 3 fitted on the light transmission tube(s) 2 according to this invention will be explained. When untreated water containing bacteria has been fed to the UV ray irradiation equipment 9 to sterilize the water, scale comprised of hardness components such as iron and calcium is deposited on the circumference surface of the light transmission tube(s) 2 and concave pits on the circumference surface of the light transmission tube(s) 2 are clogged with scale of fine particles comprised of hardness components, etc. with the result that the UV ray irradiation dose transmitted through the UV ray transmission tube(s) 2 drops.

In order to cope with such drop in the UV ray irradiation dose, the circumference of the light transmission tube(s) 2 is cleaned by reciprocally sliding the scraper ring(s) 3 over the circumference surface of the light transmission tube(s) 2 by means of the moving frame 12 reciprocally moved by virtue of the revolving screw stem 11 driven by the drive unit 10 such as a motor while a cleaning solution such as a phosphoric acid solution is fed from a cleaning solution storage tank (not shown) to the cleaning solution chamber 6 of the scraper ring(s) 3 via the cleaning solution feed pipe 5. The cleaning solution in the cleaning solution chamber 6 may be recirculated by connecting the cleaning solution chamber 6 and the cleaning solution tank via a cleaning solution outlet pipe (not shown). Alternatively, the cleaning solution tainted with foulants may be discharged to a cleaning solution waste tank (not shown) without recirculating the cleaning solution waste.

That is to say, this invention provides UV ray irradiation equipment capable of continuously, without suspending its operation, dislodging and washing out not only scale comprised of hardness components, etc which is deposited on the circumference surface of the light transmission tube 2 but also scale comprised of fine particles of hardness components, etc. which clogs concaved pits on the circumference surface of the light transmission tube 2 by virtue of a synergistic effect of dislodging action created by sliding the scraper ring 3 over the circumference surface of the light transmission tube 2 and cleaning action of a small quantity of cleaning solution such as a phosphoric acid solution which is stored in the cleaning solution chamber 6 of the scraper ring 3. In this way, any drop in the dose of UV rays transmitted through the UV transmission tube 2 is made up for.

The cleaning of the light transmission tube 2 by reciprocally (back and forth) sliding the scraper ring 3 over the circumference surface of the light transmission tube 2 may be automatically initiated in response to any drop in the UV irradiation dose transmitted through the light transmission tube 2 as detected by means of a known UV ray dose meter. Alternatively, the cleaning of the light transmission tube 2 may be started periodically and intermittently by means of a timer which is to be preset after confirming the number of bacteria in the treated (UV ray irradiated) water, sterilization conditions and so forth.

When untreated water is sterilized by UV irradiation using the UV ray transmission tube 2 coated with fluorocarbon resin, the number of fine particles of scale of hardness components and the like which penetrate into concave pits on the UV ray transmission tube 2 is much smaller than the case where the UV ray transmission tube 2 not coated with fluorocarbon resin is used as the coating of the UV ray transmission tube 2 with fluorocarbon resin minimizes concave pits on its surface. What is more, as its surface is coated with fluorocarbon resin to enhance its smoothness, thereby making it difficult for scale of hardness components and the like in water to attach to and deposit on said surface, the UV ray transmission tube 2 is less susceptible to fouling.

However, as the UV irradiation of untreated water proceeds, fine particles of scale of hardness components and the like penetrate into any residual, trace concave pits on the UV ray transmission tube 2 and these particles also begin to deposit on the surface of the UV ray transmission tube 2, with the result that the UV irradiation dosage level drops. To cope with such drop in the UV ray irradiation dosage scale of hardness components and the like which have penetrated into concave pits on the surface of the LTV ray transmission tube and also scale of hardness components and the like which have deposited on said surface are dislodged or dissolved by virtue of a synergistic effect of the scraper ring 3 which slideableness is enhanced and which friction resistance is reduced, and the cleaning solution in the cleaning chamber 6. thereby easily and surely restoring the UV ray irradiation dosage level, thereby increasing the throughput of the UV irradiation treatment.

EXAMPLE 1

Three sets of UV ray irradiation equipment each having a light transmission tube internally fitted with a 100 V low pressure mercury lamp made of quartz glass and having 253.7 nm wave length (Product No. AY4 manufactured by Japan Photo Science Co., Ltd.) were installed. The first set in accordance with the present invention was equipped with a slidable scraper ring made of rubber and having an internal cleaning solution chamber with a capacity of holding 5 cc of chemical solution. The second set had a conventional scraper ring made of rubber and slidably equipped. The third set was also a conventional UV ray irradiation unit without a scraper ring.

Secondary sewage effluent containing 103 n/ml of *E. coli* was sent to each set of the UV ray irradiation equipment at a flow rate of 0.08–1.1 m/s. and UV ray was irradiated at a dose level of 4 mw/cm$^2$. to sterilize *E. coli* in the secondary sewage effluent.

While a 5% phosphoric acid solution was fed to the cleaning solution chamber of the scraper ring of the first set, the scraper ring was slid twice a day to clean the light transmission tube. The scraper ring of the second set was also slid twice a day to clean the light transmission tube. The light transmission tube of the third set was not cleaned.

EXAMPLE 2

As an embodiment of this invention, six UV ray transmission tubes made of quartz glass and charged with 160 W UV lamps emitting UV rays of wave lengths in the neighborhood of 254 nm (Product No. AY-10 manufactured by Japan Photo Science Co., Ltd.) were installed in an enclosed UV ray irradiation vessel, with the surface of each UV ray transmission tube being coated with a film (about 0.5 mm thick) of the copolymer resin of tetrafluoroethylene-hexafluoropyrene (FEP) and also each UV ray transmission tube being slidably fitted with a scraper ring having a protrusion at each of its ends and made of the copolymer resin of tetrafluoroethylene-perfluoroalkylvinyl ester. The scraper ring was fitted with a 5-cc cleaning solution chamber.

As a conventional UV ray irradiation equipment, the same equipment as mentioned above was used, excepting that the UV ray transmission tubes were not coated with FEP and that the scraper rings made of rubber were slidably fitted to the UV ray transmission tubes.

To each of the UV ray irradiation equipment in accordance with this invention and the conventional one was fed sea water containing $10^5$ pcs./ml of bacteria at a flow rate of 30 m$^3$/hour. The rpm of the rotating screw driving the scraper rings was 18 and the sliding speed of the scraper rings was 9 cm/min. The scraper rings were operated two reciprocation's per day. Under these conditions, the sterilization by UV ray irradiation was carried out, and treated wafer containing less than $10^2$ pcs./ml of bacteria was obtained from two pieces of equipment compared.

In the UV ray irradiation equipment in accordance with this invention, the above mentioned UV ray irradiation was carried on for one year, during which time no hardness components, iron on the like in the sea water adhered to the surface of UV ray transmission tubes nor the UV ray transmission efficiency dropped with the result that a constant sterilization cost of the sterilization was no more than 1.94 yen/m$^3$.

By contrast, the UV ray transmission tubes of the conventional UV ray irradiation equipment were fouled with deposits of hardness components, iron and the like in three months after the start of the above-mentioned UV irradiation treatment. As a result, the UV ray transmission efficiency dropped to 60% and the number of bacteria in the treated water increased to $10^5$~$10^4$ pcs./ml. Hence, the UV ray irradiation had to be suspended at bimonthly intervals to disassemble the equipment and to remove the UV ray transmission tubes, from which scale deposits had to be dislodged and cleaned off. The running cost of the sterilization increased to 2.25 yen/m$^3$.

The sterilization of the secondary sewage effluent as mentioned above was carried out for six months using the three sets of UV ray irradiation equipment. As a result, the following sterilization performance data were obtained.

| UV ray Transmission Rate* | | Flow Rate to Achieve 99% | |
|---|---|---|---|
| Lamp** | Power Consumption | Sterilization per Power Efficiency | |
| 1st Set (this invention) | 98% | 9.8 m$^3$/hr. 10.2 W/m$^3$ | 2.33 |
| 2nd Set (conventional) | 65% | 6.5 m$^3$/hr. 15.4 W/m$^3$ | 1.55 |
| 3rd Set (conventional) | 42% | 4.2 m/hr. 23.8 W/m$^3$ | 1.00 |

*Rate of UV Ray Transmission through Light Transmission Tube
**Flow rate of the secondary sewage effluent per one lamp that allowed 99% sterilization The present invention provides UV ray irradiation equipment capable of bringing about a synergistic effect of dislodging action of a scraper ring(s) and cleaning action of a small quantity of cleaning solution stored in a cleaning solution chamber(s) of the scraper ring(s) thereby dislodging and washing out not only scale comprised of hardness components, etc. which is deposited on the circumference surface of a light transmission tube(s) but also scale comprised of fine particles of hardness components, etc. which clogs concave pits on the circumference surface of the light transmission tube(s). In this way, the UV ray irradiation equipment in accordance with the present invention brings about such beneficial effects as easily and surely restoring (by about 98%) the irradiation dose lost through the light transmission tube(s), increasing the UV ray irradiation flow rate (1.5 to 2 times), and the power efficiency of UV ray lamp thereby enhancing the overall light irradiation efficiency.

Unlike the conventional chemical cleaning using a weak acid solution, a scale dispersant solution or the like, the present invention also permits easily and surely washing out scale composed of hardness components, etc. and deposited on a light transmission tube(s) without disassembling a UV ray irradiation unit and taking out the light transmission tube(s). Hence, the present invention also confers a benefit of not necessitating any suspension of the UV ray irradiation, and permits equipment automation. These benefits of the present invention leads to an enhanced UV ray irradiation efficiency.

In the UV ray irradiation equipment in accordance with the present invention, the scraper ring(s) can be slid reciprocally over the circumference surface of the light transmission tube(s) by rotating, through a drive unit, a revolving screw stem which is connected to the scraper ring(s) via a moving frame. This drive configuration facilitates automation of the cleaning operation. This driving configuration also permits use of a plurality of light transmission tubes each internally fitted with a light irradiation lamp to cope with large throughput requirements.

In the UV ray irradiation equipment in accordance with the present invention, a sealing material(s) such as an O-ring(s) may be fitted on the circumference surface of the light transmission tube with which the scraper ring comes in contact and adjacent to the cleaning chamber of the scraper ring. In this way, any leakage of the cleaning solution from the interstice of the scraper ring and its cleaning solution chamber can be prevented without fall.

Coating UV ray transmission tubes with fluorocarbon resin and the like thereby enhancing the smoothness of the surface of the tubes in accordance with this invention results in (1) making it much less likely for scale of hardness components and the like to adhere to the surface of UV ray transmission tubes or making it very easy to dislodge any scale attached thereto, (2) enhancing the slidability and reducing the friction resistance of scraper rings thereby making it possible to effectively dislodge the scale, and (3) completely dislodging and washing off the scale penetrated into, adhered to, and/or deposited on the surface of UV ray transmission tubes with a synergistic effect bough about by the cleaning solution in the cleaning chambers of scraper rings which cleaning solution has access to scale in every nook and comer. Thus, coating UV ray transmission tubes with fluorocarbon resin and the like in accordance with this invention permits restoring to about 99% of the original value the light irradiation dosage level which has dropped, increasing the light irradiation treatment flow rate 1.8- to 2.3-fold as compared with the case of the conventional equipment, enhancing the electricity efficiency of UV ray lamps (1.7- to 2.5-fold) and improving on the overall UV ray irradiation efficiency to a great extent.

What is claimed is:

1. A UV ray irradiation apparatus for irradiating untreated water to sterilize bacteria, decompose organics by oxidation, decompose harmful substances and achieve other objectives, the apparatus comprising:

a light transmission tube having an internal light irradiation lamp and a smooth layer of a resin material covering the outside circumferential surface of said tube;

a scraper ring slidably and tightly fitted to the circumferential surface of said light transmission tube, said scraper ring having an internal cleaning solution chamber communicating with a chemical solution supply pipe; and a mechanism coupled to said scraper ring to cause the scraper ring to be reciprocally moved over the circumferential surface of said light transmission tube to wash said light transmission tube.

2. A UV ray irradiation apparatus as set out in claim 1, wherein a sealing material is fitted on the surface of said light transmission tube adjacent to said cleaning solution chamber.

3. A UV ray irradiation apparatus as set out in claim 2, wherein the sealing material is an O-ring.

4. A UV ray irradiation apparatus as set out in claim 1, wherein said scraper ring is reciprocally slid over the circumferential surface of said light transmission tube by connection said scraper ring with a moving frame which is fitted to a rotating screw stem installed externally to said light transmission tube, and normally and reversely rotated by a drive means.

5. A UV ray irradiation apparatus as set out in claim 4, wherein said drive means comprises a motor.

6. A UV ray irradiation apparatus as set out in claim 1, wherein the resin layer on the surface of the light transmission tube lamp is a fluorocarbon resin film deposited by a coating process on the outside surface of the tube.

7. A UV ray irradiation apparatus as set out in claim 1, wherein said scraper ring is composed of a copolymer resin of tetrafluoroethylene-perfluoroalkylvinyl ester.

8. A UV ray irradiation apparatus as set out in claim 1, wherein said layer of resin material has a thickness of from 0.3 to 0.5 mm.

9. A UV ray irradiation apparatus as set out in claim 1, wherein said layer of resin material is a tubular heat shrink fluorocarbon resin material.

10. A method of improving the UV irradiation efficiency of a UV irradiation apparatus having one or more UV ray transmission tubes having an outside circumferential surface and an inner UV lamp, comprising the steps of:

providing a smooth layer of a resin material over said outside surface of said one or more UV ray transmission tubes; and reciprocating an annular cleaning member having an annular cleaning solution chamber containing a cleaning solution over said layer of resin material to remove deposits from said layer.

11. A method as set out in claim 10, wherein said step of providing a layer comprises heat shrinking a tubular sheath of a fluorocarbon resin material onto said UV transmission tube.

12. A method as set out in claim 10, wherein said step of providing a layer comprises depositing a film on the surface of said UV transmission tube.

13. A method as set out in claim 10, wherein said step of reciprocating said cleaning member is performed during irradiation operations by said UV lamps.

14. A method as set out in claim 10, wherein said step of providing a layer comprises providing a layer of fluorocarbon resin having a thickness of from 0.3 mm to 0.5 mm.

* * * * *